United States Patent Office 3,468,834
Patented Sept. 23, 1969

3,468,834
COATING COMPOSITIONS AND PROCESS OF PREPARING THE SAME
Akira Oda, Hara 20-ku, Kamiumeda, Konan-ku, Ube-shi, Yamaguchi-ken, Japan
No Drawing. Continuation-in-part of application Ser. No. 527,082, Feb. 14, 1966. This application Aug. 1, 1967, Ser. No. 657,523
Claims priority, application Japan, Feb. 15, 1965, 40/8,178, 40/8,179
Int. Cl. C09d 3/74, 5/08
U.S. Cl. 260—32.8                    8 Claims

ABSTRACT OF THE DISCLOSURE

A coating solution having a high drying rate and good workability comprising an ABS resin, a good solvent selected from the group consisting of methyl ethyl ketone, methyl isobutyl ketone and ethylene dichloride and a diluent selected from the group consisting of toluene, xylene, butanol and mixture thereof, the weight ratio of ABS resin/good solvent being about 0.1–0.7 and the weight ratio of diluent/(ABS resin and good solvent) being about 0.5–2.

An undercoat paint comprising the coating solution above mentioned and a member of the group consisting of a thermosetting resin curable at normal temperature and a styrene monomer, the weight ratio of said member/ABS resin being 90:10–10:90.

---

The present application is a continuation-in-part of U.S. patent application Ser. No. 527,082, filed Feb. 14, 1966, now abandoned.

This invention relates to coating solutions and a process of preparing the same. More particularly, it involves coating solutions employing acrylonitrile-butadiene-styrene resins. In the present application "acrylonitrile-butadiene-styrene resin" (hereinafter referred to as "ABS resin") is defined as (1) a graft or block terpolymer of acrylonitrile, butadiene and styrene or alpha methyl styrene, or (2) a mixture of copolymers and/or homopolymers of the three components such that the mixture contains each of the components in polymeric form, e.g. a mixture of a copolymer of acrylonitrile and styrene and a polybutadiene. Graft polymers formed by grafting acrylonitrile and styrene or alpha-methyl styrene on polybutadiene are preferred. The ABS resin, as used herein, consists of 10–30 weight percent of combined acrylonitrile in polymeric form, 20–60 weight percent of combined butadiene in polymeric form, and 30–70 weight percent of combined styrene or alpha methyl styrene in polymeric form.

ABS resins may be prepared by any convenient method well known in the art. For example, polybutadiene or a butadiene-styrene copolymer may be mixed with acrylonitrile monomer and styrene or alpha methyl styrene, in proportions to provide combined monomer in polymeric form within the above ranges, and the mixture emulsified and polymerized with a suitable catalyst, e.g., a redox catalyst, at temperature of about 50–100° C.

Herein, the term "coating solution," regardless of whether or not it is used or in combination with other agents (for example, pigments, fillers and the like), means paints, adhesives, coatings, space fillers and the like which are used for the purpose of covering a solid surface in part or entirely. The coating solutions may be coated upon a layer of a previously applied coating composition.

The coating solutions of the present invention are particularly suitable for forming an anticorrosion coating on metallic materials and water-proofing and moisture-proofing of materials.

The solution can be used as adhesives for bonding between same or different materials, such as metal, wood, cement, synthetic plastic.

Herein, percentages, parts and ratios are by weight unless otherwise specified.

Although the present invention can be applied over a wide field as abovementioned for convenience of explanation, the following descriptions are limited to the applications in which ABS resin is used as paint component.

In general, conventional paints have such defects that when the drying rate is fast, workability is bad, and when the workability is good, the drying rate is slow.

We have obtained paints of satisfactory high drying rate and good workability at the same time by employing a combination of good solvent and diluent with ABS resins.

It is well known that when ABS resins are used as shaped articles, they have excellent properties as follows:

(1) Impact strength is high over a broad range of temperature.

(2) Owing to their high thermal distortion temperature, under normal handling conditions, no strain or warpage is observed.

(3) Electrical characteristics, low temperature properties and weatherability are excellent.

(4) Chemical resistance is good and they are hardly affected by acids, bases, salts and fatty oils.

(5) Dimensional stability is good.

(6) Specific gravity is low (1.02) and hardness is high.

(7) It is possible to make mixture of different hardness, elongation and impact strength by blending with various synthetic resins, synthetic rubbers, plasticizers and the like.

(8) They are suitable for articles requiring a glossy finish and have wide coloring properties.

(9) They are well suited for processing by injection molding, calendering, extrusion, vacuum forming and blow molding.

In spite of the fact that ABS resins have such excellent properties, they have never been adopted heretofore as paints and other coating materials. The reasons are that the bond strength of ABS resins to other materials is poor and their workability is insufficient. In particular, when ABS resin is admixed with a good solvent in a simple way and then is applied as paint, due to the high volatility of the solvent used, the speed of shrinkage of the film is so fast that not only poor bond strength is produced but also the workability is rendered poor. In addition, air bubbles remain in the dried paint film.

An object of the present invention is to provide coating solutions of satisfactorily high drying rate and good workability at the same time, these two factors being considered incompatible with each other heretofore.

Another object of the present invention is to provide coating solutions containing ABS resins, which solutions have excellent bonding properties and workability and have the advantage that air bubbles never remain in the dried coating film.

A further object of the present invention is to provide inexpensive coating solutions which are excellent in properties such as corrosion resistance, water (moisture) proofing, oil resistance, impact strength (especially at the low temperature), hardness, abrasion resistance, coated film stability, gloss, workability, nondripping, and long pot life.

A still further object of the present invention is to provide a process of preparing the coating solution as above mentioned effectively and commercially.

Accordingly, the present invention provides a coating solution comprising an ABS resin consisting of 10–30% by weight of combined acrylonitrile in polymeric form, 20–60% by weight of combined butadiene in polymeric form, and 30–70% by weight of at least one combined styrene compound selected from the group consisting of styrene and alpha methyl styrene in polymeric form; a good solvent selected from the group consisting of methyl ethyl ketone, methyl isobutyl ketone and ethylene dichloride; and a diluent selected from the group consisting of toluene, xylene, butanol and mixtures thereof; the weight ratio of ABS resin/good solvent being about 0.1–0.7 and the weight ratio of diluent/(ABS resin and good solvent) being about 0.5–2.

The coating solution is desirably prepared by admixing said ABS resin with said good solvent and then dispersing the thus obtained admixture in said diluent or by dispersing said ABS resin in said diluent to form a dispersion and then admixing said good solvent.

After continuous stirring for 24 hours, 3 parts by weight of the good solvent will completely dissolve 1 part by weight of ABS resin, with no solid remaining. The boiling point of the good solvent is in the range of 70 to 120° C. It is preferred to use a mixture of methyl ethyl ketone and ethylene dichloride as the good solvent.

The diluent to be used in the present invention, namely toluene, xylene or butanol, or a mixture thereof such as lacquer thinner, is not a good solvent for ABS resins but can disperse or swell said resin. After stirring 1 part by weight of ABS resin and 3 parts by weight of diluent for 24 hours at room temperature, about 90% of the ABS resin remains as solid. The boiling point of the diluent is in the range of 100°–150° C. The diluent must be compatible with the good solvent to be used in combination with the diluent. From the viewpoint of coating film properties and cost, it is preferable that toluene is employed as diluent.

In this case, from the respect of boiling point, it is preferable that a mixture of methyl ethyl ketone and ethylene dichloride is employed as the good solvent. In fact, evaporation of methyl ethyl ketone (B.P. 79.6° C.), ethylene dichloride (B.P. 83.7° C.) and toluene (B.P. 110.6° C.) after coating can be conducted in sequence when a mixture thereof is used, due to the relation of their boiling points.

The weight ratio of ABS resin/good solvent is about 0.1–0.7 and the weight ratio of diluent/(ABS resin and good solvent) is about 0.5–2. Thus, the weight ratio of diluent/good solvent can be calculated from these ratio and is found to be about 0.5 to 3.4.

In order of mixing the ABS resin, good solvent and diluent is not limited particularly. In some cases the good solvent is added to the ABS resin and then a diluent is added. In other cases, the diluent is added to the ABS resin and then the good solvent is added. A mixture of the good solvent and diluent may even be added to the ABS resin.

We have found that when the diluent is added to the ABS resin and then the good solvent is added, especially good results can be obtained. In particular, in this case, it is possible to increase the resolvability of the good solvent by dispersing said resin in the diluent first of all, though the reason for this is not well understood. In this case, upon adding the diluent, the resin is not yet dissolved and is in a dispersed or swelled state (in such a state, if leaving it without agitation, the phenomenon is observed that the resin is precipitated and separated from the liquid), and when the good solvent is added thereto, a uniform dissolved state (in such a state, even without agitation, the resin is not precipitated and not separated from liquid) is rapidly attained. Thus, the dissolving rate is shortened, the resin is dissolved uniformly and a relatively small amount of good solvent is sufficient.

By contrast, when the diluent is added first, followed by the good solvent, much longer time and much larger amount of good solvent are required for obtaining uniform solution (with the same amount of good solvent and the same dissolving time, only non-uniform solution can be obtained).

In the present invention, the ABS resin should be mixed with good solvent and diluent at a temperature below the boiling point of the solvent or diluent. Usually, temperatures of from room temperature to 50° C. are preferable.

The methods of applying the coating solution of the present invention are not limited particularly. Any of brushing, troweling, spraying, dipping and other conventional methods can be adopted. After applying the solution, heating and baking, for example, at a temperature of 110° C.±20° C. for 10–20 minutes, can further increase the bond strength.

Undercoat paints according to the present invention comprise the coating solution hereinbefore defined and a styrene monomer or a thermosetting resin curable at normal temperature. Suitable thermosetting resins include ketone resins, epoxy resins, polyesters and polyurethanes. The mixing ratio of thermosetting resin versus the ABS resin is 90:10–10:90. ABS resin used in the undercoat paint may be same as or different from ABS resin used in the topcoat paint.

In the following Examples the ABS resin employed is a graft terpolymer containing 30 weight percent polybutadiene 25 weight percent combined acrylonitrile in polymeric form, and 45 weight percent combined styrene in polymeric form, prepared in accordance with Japanese Patent 244,403 by grafting acrylonitrile monomer and styrene monomer onto a polybutadiene backbone. This graft terpolymer is identified in the examples as "ABS resin A". Additionally, the "lacquer thinner" used in the Examples is a mixture, by weight, of 60% xylene, 10% n-butyl alcohol, 10% n-butyl acetate and 15% mixed amyl acetates.

EXAMPLE 1

This example is a comparison test for compositions outside the present invention.

The following materials were used:

ABS resin A
Methyl ethyl ketone (hereinafter referred to as M.E.K.)
Ethylene dichloride (hereinafter referred to as E.D.C.)

Test A

| | Percent |
|---|---|
| ABS resin A | 50 |
| M.E.K. | 50 |

ABS resin A was mixed with and dissolved in M.E.K. A putty-like composition was obtained. Under this condition the composition was difficult to work. So, with agitation M.E.K. was added further to the following ratio, and a coatable composition was obtained.

| | Parts |
|---|---|
| ABS resin A | 100 |
| M.E.K. | 200–300 |

When the solution prepared as above mentioned was coated on a surface of a steel plate with a brush, the following facts were found:

(a) The drying rate is fast resulting in difficulty in the brushing operation. Thus the workability is poor.

(b) Because the solvent cost is expensive, the composition is not preferable from the economic point of view.

(c) Because the shrinkage of the coating film is large, the adhesion to the coated body is poor.

(d) The solution is slightly milky white.

(e) Air bubbles remain in the dried coating film.

Test B

| | Percent |
|---|---|
| ABS resin A | 50 |
| E.D.C. | 50 |

In a similar manner as in Test A, the following final solution was prepared.

| | Parts |
|---|---|
| ABS resin A | 100 |
| E.D.C. | 200–300 |

The results of coating the above solution on a surface of steel plate with a brush were as follows:
(a) Similar to the solution in Test A.
(b) The solvent cost was reduced by 15% compared to Test A.
(c) Almost the same as the solution in Test A.
(d) Transparency is higher as compared to Test A.
(e) Similar to Test A.

Test C

| | Percent |
|---|---|
| ABS resin A | 50 |
| Acetone | 50 |

In a similar manner as in Test A, the following final solution was prepraed.

| | Parts |
|---|---|
| ABS resin A | 100 |
| Acetone | 200–300 |

The results of coating the above solution on a surface of steel plate with a brush were as follows:
(a) Extremely worthy compared to Test A.
(b) A little higher compared to Test B.
(c) Similar to Test A.
(d) Similar to Test A.
(e) Similar to Test A.
(f) When again coating the composition over the dried coating film of the same composition, cracks and peels were produced in the dried coating film.

The solution prepared by using single solvents as in the above Tests A, B and C were difficult to use as a coating material.

EXAMPLE 2

This example illustrates comparison tests—to examine the difference in effects on the coating film of diluents. Two diluents were examined; one is outside the present invention and the other is within the present invention. 50 parts of ABS resin A were dissolved in the following (A) and (B) respectively.

(A) (Comparative example): A mixture of 100 parts of a 50:50 M.E.K.–E.D.C. mixed good solvent and, as diluent, 150 parts of acetone (low boiling point solvent) which is a good solvent for ABS resin.

(B) (The present invention): A mixture of 100 parts of a 50:50 M.E.K.–E.D.C. mixed good solvent and, as diluent, 150 parts of toluene (medium boiling point solvent) which is a poor solvent for ABS resin.

In the case of coating the solution of ABS resin and (A) on a surface of steel plate, the drying time by finger touch was 3–5 minutes. But the film was liable to peel off and upon repeated coating, cracks were developed from relatively thinner parts of the dried coating film.

On the other hand, in the cases of coating the solution of ABS resin and (B) on a surface of steel plate, the drying time by finger touch was about 15 minutes and the bond strength was not reduced so much and no cracks were produced.

EXAMPLE 3

This example illustrates comparison tests to examine the difference in effects on the resultant composition of diluents. The following diluents were selected. The diluents (A), (D) and (E) are within the present invention and the diluent (B) and (C) are outside the present invention.

(A) Lacquer thinner
(B) Ethanol
(C) Mineral turpentine
(D) Butanol
(E) Toluene 100 parts of the solution composed of the following materials was diluted with 50 parts of each of the above five diluents respectively.

| | Percent |
|---|---|
| ABS resin A | 30 |
| M.E.K. | 30 |
| E.D.C. | 40 |

The results were as follows:

(A) Lacquer thinner — Compatibility is good.
(B) Ethanol — The solution turns milky white and cannot be diluted.
(C) Mineral turpentine — The solution cannot be diluted.
(D) Butanol — Compatibility is good.
(E) Toluene — Compatibility is good.

Thus, only the three diluents (A), (D) and (E), within the present invention, are effective as diluent. The other diluents (B) and (C) being outside the present invention are not suitable as diluent.

EXAMPLE 4

This example illustrates comparison tests to examine the difference in effects of diluents used as (A), (D) and (E) in Example 3, namely, lacquer thinner, butanol and toluene, all of which are diluents within the present invention.

Firstly, tests to compare toluent (E) and lacquer thinner (A) as diluent were conducted. 100 parts of the solution composed of the following material was diluted with each of the above two diluents respectively.

| | Percent |
|---|---|
| ABS resin A | 30 |
| M.E.K. | 30 |
| E.D.C. | 40 |

These solutions were coated on a surface of steel plate respectively. The coated area was 500 mm. x 500 mm. Coating was repeated four times over and over with one sample. The same test was repeated four times respectively.

Examination with pinhole tester (Toyo Kiki K.K. AC. 100 v.) observed no pinholes over all samples.

The thickness of all coating film was 0.2 mm. by measuring with a Elcometer.

Appearance examination using a magnifying glass observed an average 1.25 of traces of air bubbles over the surface of coating film using the solution diluted by toluene as diluent, and 10.25 of traces over the surface of coating film using lacquer thinner as diluent. These traces are not pinholes, but it is considered that they cause pinholes.

Further, in order to examine the residual volatile contents, one hour after the final coating, the above coating films were heated at a temperature of 50° C. for 30 minutes, and the increase in the number of air bubbles was determined.

The results were as follows:

| | Average |
|---|---|
| Solution diluted by toluene | 0.25 |
| Solution diluted by lacquer thinner | 0.75 |

No increase in air bubbles was observed after three hours from final coating. As is apparent from the above results, the number of air bubbles was less in the case using toluene than the case using lacquer thinner. However, in the point of brushing operation (workability), lacquer thinner was more favorable to some extent than toluene.

The results of tests using butanol as diluent show the number of air bubbles traces, the increase in number thereof upon heating and workability, as similar to the results in the case of using toluene.

EXAMPLE 5

This example illustrates how to apply the solution of the present invention.

(1) Preparation of base solution:

| | Kg. |
|---|---|
| ABS resin A | 8 |
| Methyl isobutyl ketone | 10 |

The ABS resin A was dissolved in methyl isobutyl ketone with agitation and then 3.5 kg. of diacetone alcohol were added thereto. Further 15.5 kg. of toluene were added to dilute the solution.

(2) Preparation of undercoat paint:

To 7.5 kg. of the above base solution, the following materials were added to form the undercoat paint.

| | Kg. |
|---|---|
| Clay | 2 |
| Styrene monomer | 2 |
| Dimethyl phthalate | 0.3 |
| Red lead | 3 |

(3) Preparation of top coat paint:

3% of dimethyl phthalate was added to the base solution mentioned in (1) to form top coat paint.

Onto a surface of steel plate, the undercoat paint and the top coat paint were coated in this order. The resultant coating film was excellent in various properties.

EXAMPLE 6

The example illustrates the composition of another undercoat paint according to the present invention.

| | Parts |
|---|---|
| ABS resin A | 12 |
| M.I.B.K. | 15.5 |
| Toluene | 27.5 |
| Clay | 12 |
| Red lead | 22 |
| Ketone resin | 8 |
| Xylene resin | 2 |
| Epoxy resin | 1 |
| Total | 100 |

Onto a surface of steel plate, the undercoat paint and the topcoat paint above mentioned were coated in this order. The resultant coating film has a high bond strength.

EXAMPLE 7

This example relates to comparison tests showing the noneffectiveness of the use of benzene.

Test 1

(1) 25 parts of ABS resin A were added to 100 parts of mixed solvent comprising 75 parts of benzene and 25 parts of M.E.K.

(2) The resultant mixture was agitated for 15 minutes and left undisturbed to settle for 15 minutes, a process which is referred to as one (1) cycle. After one cycle was completed, the ABS resin started to dissolve, and after 3 cycles all undissolved solids disappeared.

(3) The resultant solution was then held undisturbed.

(4) The said solution became separated into two layers.

(5) Upon removing and subsequent analyzing of the top layer (mainly benzene), hardly any ABS resin was discovered in said layer.

(6) A 25% M.I.B.K. solvent in lieu of M.E.K. also provided the same result.

Test 2

(1) 25 parts of ABS resin A was added to 75 parts of benzene.

(2) After agitating said mixture for 5 cycles, no change of condition in the ABS resin was found to have developed.

Test 3

(1) 25 parts of ABS resin A was added to 75 parts of M.E.K. and to 75 parts of M.I.B.K.

(2) A totally dissolved state of said mixture developed after 2 cycles.

(3) 10 to 50 parts of benzene was mixed in the resin solution of Test 3(2) above, which was subsequently agitated.

(4) The resultant resin solution then developed a skin on its surface area, which turned to be incompatible with benzene.

(5) Even following agitation of 10 cycles, the condition remained the same as Test 3(4) above.

In Test 1, it initially appeared that benzene might possibly be used as an assistant solvent and that it might be effective for dissolving ABS resin however, as proved in Test 1(4) and (5), the result was to the contrary.

Considering Test 2, benzene is evidently not a good "solvent."

Moreover, as manifested in Test 3, benzene is inappropriate as an ingredient of an ABS resin coating composition.

EXAMPLE 8

This example shows results of tests made with benzene in substitution for toluene of Example 2(B).

The tests was made similarly to Example 2(B) with the exception of substituting benzene for toluene.

Test 1

50 parts of E.D.C., 50 parts of M.E.K. and 50 parts of ABS resin A were mixed with agitation. 150 parts of benzene was added to the mixture. In the mixture, benzene did not mix at all with the solution consisting of ABS, M.E.K. and E.D.C. and the benzene was expelled and coagulated. This resulted in a skin on the surface of the resin solution, showing that there was no compatibility of the solution with benzene.

Test 2

This test was made by adding ABS resin A to a mixture of benzene, M.E.K., E.D.C. in a different order of preparation from Test 1.

The results in comparison with Example 2(B) are as follows.

| | Example 2(B) | Test 2 |
|---|---|---|
| (1) Agitation 0.5-3 hour. | Soluble | Soluble. |
| (2) Held undisturbed for more than 0.5 hour. | No separation nor precipitation. | Extremely separable. |
| (3) Coating just after agitation. | Good coating film produced. | Cannot form coating film. |

Humidity 85%, temperature 23° C.

Especially as to the case of holding undisturbed of (2), if the mixture is held undisturbed for a long time (more than 24 hours), the solution of M.E..K, E.D.C. and ABS resin precipitates at the bottom and benzene separates in the top layer with its contact surface coagulated, simularly to the result of Test 1. Accordingly as apparent from Examples 7 and 8, although benzene is closely similar in chemical structure to toluene and xylene, which are used as diluents in the solutions of the present invention, the effect and merits of benzene, when used in the solutions of the present invention, are quite different from toluene and xylene. As far as the present invention is concerned, benzene is not the equivalent of toluene and xylene.

EXAMPLE 9

This example illustrates the effective ranges of the weight ratio of ABS resin/(good solvent) and the weight ratios of diluent/(ABS+good solvent) in the composition of the present invention.

First, the results of mixing ABS resin A with M.I.B.K., M.E.K. or E.D.C., as the good solvent, are tabulated as follows. Table 1 shows the ratio of ABS resin A to good solvent; Table 2 indicates how the mixtures of each run were prepared; and Table 3 shows the results of each run.

TABLE 1.—COMPOSITION (PARTS BY WEIGHT)

|  | Run No. | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| ABS resin A | 100 | 100 | 100 | 100 | 100 | 100 | 100 | 100 | 100 | 100 | 100 |
| Good solvent | 100 | 120 | 140 | 160 | 200 | 400 | 800 | 900 | 1,000 | 1,100 | 1,200 |
| ABS resin/good solvent | 1.00 | 0.83 | 0.71 | 0.62 | 0.50 | 0.25 | 0.12 | 0.11 | 0.10 | 0.09 | 0.08 |

TABLE 2.—CYCLE NUMBER

| Good solvent | Run No. | | | | | | | | | | |
| --- | --- | --- | --- | --- | --- | --- | --- | --- | --- | --- | --- |
|  | 1 | 2 | 3 | 4 | 5 | 6 | 7 | 8 | 9 | 10 | 11 |
| M.E.K. | 20 | 20 | 20 | 15 | 10 | 10 | 8 | 8 | 5 | 5 | 5 |
| M.I.B.K. | 20 | 20 | 20 | 15 | 15 | 10 | 8 | 8 | 5 | 5 | 5 |
| E.D.C. | 20 | 20 | 20 | 15 | 15 | 10 | 8 | 8 | 5 | 5 | 5 |

NOTE.—Cycle number means number of cycle. A cycle means that a composition is agitated for 15 minutes, and left undisturbed to settle for 15 minutes at a room temperature.

TABLE 3.—OBSERVATIONS

| Good solvent | Run No. | | | | | | | | | | |
| --- | --- | --- | --- | --- | --- | --- | --- | --- | --- | --- | --- |
|  | 1 | 2 | 2 | 4 | 5 | 6 | 7 | 8 | 9 | 10 | 11 |
| M.E.K. | A | B | C | C | D | D | D | E | E | F | F |
| M.I.B.K. | A | B | C | C | D | D | D | E | E | F | F |
| E.D.C. | A | A | B | C | D | D | D | E | E | F | F |

Remarks

A. Not less than 10 undissolved resin particles remain in 10 cm.² of coating film.

B. Not more than 10 particles of undissolved resin particles remain in 10 cm.² of coating film.

C. Gelled after indicated cycles. No undissolved resin powder is observed in coating film.

D. Dissolved into a resin solution of high viscosity. No undissolved resin powder is observed in coating film.

E. Dissolved into a resin solution of low viscosity. Paintable by brush with no addition of diluent.

In peeling off with one end the coated film with which a glass plate is coated, a continuous stripped coating film extending over the entire surface area, or at least ½ of the entire surface area, is obtained.

F. When peeled off under conditions similar to E, a continuous stripped coating film cannot be obtained.

In the cases A and B, owing to a comparatively smaller volume content of solvent than resin, no uniform swelling and solution is made and there are areas of resin powder in almost unchanged condition. It cannot be said that solutions of high quality were obtained.

In C and D, by adding proper volume of diluent, a good resin solution can be obtained.

In E, brush coating is available without addition of diluent, but is accompanied by the risk of "solvent cracking" and "blushing" in lap coating. When a diluent is added, the resin concentration drops so that the solution is unsuitable for a protective coating material. Only in the case of applying this resin solution with no addition of diluent, the solution can be advantageously used as a strippable paint because of its quick drying feature and a single coating.

F is almost similar to E, however the resin solution is unsuitable even as strippable paint, due to lower concentration.

The workability of compositions comprising ABS resin A mixed with M.E.K., as the good solvent of the present invention, with addition of toluene, as diluent, in various percentages, and properties of finished coating films of said compositions, are tabulated as follows in Tables 4 and 5.

Tests were made at 23° C., at a humidity of 85% in a well ventilated room.

TABLE 4.—COMPOSITION (PARTS BY WEIGHT)

|  | Run No. | | | | | | | | | |
| --- | --- | --- | --- | --- | --- | --- | --- | --- | --- | --- |
|  | (1) | (2) | (3) | (4) | (5) | (6) | (7) | (8) | (9) | (10) |
| ABS resin A | 15 | 15 | 15 | 15 | 15 | 15 | 15 | 15 | 15 | 15 |
| M.E.K. | 85 | 60 | 48 | 38 | 32 | 28 | 25 | 21 | 18 | 17 |
| Toluene | 0 | 25 | 37 | 47 | 53 | 57 | 60 | 64 | 68 | 68 |
| Total | 100 | 100 | 100 | 100 | 100 | 100 | 100 | 100 | 100 | 100 |
| ABS/M.E.K. | 0.17 | 0.25 | 0.31 | 0.39 | 0.47 | 0.54 | 0.60 | 0.71 | 0.83 | 0.88 |
| Toluene/ABS+M.E.K. | 0.00 | 0.33 | 0.59 | 0.89 | 1.13 | 1.33 | 1.50 | 1.78 | 2.02 | 2.12 |

TABLE 5.—WORKABILITY AND PROPERTIES OF FINISHED COATING FILM

|  | (1) | (2) | (3) | (4) | (5) | (6) | (7) | (8) | (9) | (10) |
| --- | --- | --- | --- | --- | --- | --- | --- | --- | --- | --- |
| Dry at finger touch (minute) | 1 | 2 | 3 | 3.5 | 4 | 5 | 6 | 7 | 8 | 10 |
| Solvent cracking | Yes | No | No | No | No | No | No | No | No | No |
| Blushing | Yes | Yes | No | No | No | No | No | No | No | No |
| Undissolved ABS particles | No | No | No | No | No | No | No | No | Yes | Yes |

Tables 4 and 5 show that when the compounding ratio of diluent/ABS+good solvent is below 0.5, the resin solution is not suitable as a practical paint because of solvent cracking and blushing, and when the compounding ratio is more than 2, a good finished coated film cannot be obtained due to remaining undissolved ABS particles.

Example 10

This example shows properties of coating films formed of the following paints applied on steel plates.

Method of coating: 2 runs of primer (undercoat) of below-stated formation, followed by 3 runs of topcoat.

| Top coat paint: | Parts |
|---|---|
| ABS resin A25%, M.E.K. 40%, xylene 35% | 85 |
| Titanium oxide | 11 |
| Plasticizer | 2 |
| Stabilizer | 2 |
| Total | 100 |

| Under coat prime: | |
|---|---|
| ABS resin A 25%, M.E.K. 40%, xylene 35% | 50 |
| Epoxy resin | 20 |
| Titanium oxide | 20 |
| Talc | 10 |
| Total | 100 |

| Cure agent: | |
|---|---|
| Fatty amine | 25 |
| Xylene | 75 |
| Total | 100 |

Compounding ratio of the cure agent to the primer is 5 to 100 parts by weight.

(1) Workability of paint:
  (1) Open pot life _____ 72 hrs.
  (2) Drying time _____ 2 hrs.
  (3) Application method _____ Brush, roll and spray.

(2) Weatherability:
  (1) Exterior exposure (1 month) _____ No effect.
  (2) Weather-o-meter (300 hrs.) _____ Considerable yellowing but no chalking.

(3) Film properties:
  (1) Sward hardness (72 hrs.) _____ 14
  (2) Hoffman scratch resistance (load) __gr__ 500
  (3) Cross-cut adhesion _____percent__ 90
  (4) Mandrel flexibility:
    3/16" _____ Pass
    1/8" _____ Fail (4) Chemical resistance (see note D):

| | |
|---|---|
| 10% $H_2SO_4$ | Excellent. |
| 10% HCl | Do. |
| 37% HCl | Fair. |
| 10% $CH_3COOH$ | 1 month immersion. |
| 1% $NH_4OH$ | Excellent. |
| 10% NaOH | Do. |
| 2% NaCl | Fair. |
| 10% Sugar solid | Do. |
| Motor oil | Do. |
| Mineral spirits | Do. |
| Methanol | Poor. |
| Gasoline | Excellent. |
| Water | Do. |

D. Excellent: no effect; good: slight effect; fair: noticeable effect, softening; poor: blistering, degradation.

What is claimed is:

1. A coating solution comprising an ABS resin consisting of 10%–30% by weight of combined acrylonitrile in polymeric form, 20–60% by weight of combined butadiene in polymeric form and 30–70% by weight of at least one combined styrene compound selected from the group consisting of styrene and alpha-methyl styrene in polymeric form; a good solvent selected from the group consisting of methyl ethyl ketone, methyl isobutyl ketone, ethylene dichloride and mixtures of two or more thereof; and butanol as a diluent; the weight ratio of ABS resin/good solvent being about 0.1–0.7 and the weight ratio of diluent/(ABS resin and good solvent) being about 0.5–2.

2. The solution according to claim 1 in which said good solvent is a mixed solvent of methyl ethyl ketone and ethylene dichloride.

3. A process of preparing the coating solution according to claim 1, which comprises admixing said ABS resin with said good solvent and then dispersing thus obtained admixture in said diluent.

4. A process of preparing the coating solution according to claim 1, which comprises dispersing said ABS resin in said diluent to form a dispersion and then admixing said dispersion with said good solvent.

5. An undercoat paint comprising the coating solution according to claim 1 and a member of the group consisting of a thermosetting resin curable at normal temperature selected from the group consisting of ketone resins, epoxy resins, polyesters and polyurethanes and a styrene monomer, the weight ratio of said member/ABS resin being 90:10–10:90.

6. An undercoat paint, comprising the coating solution according to claim 1 and thermosetting resin curable at normal temperature selected from the group consisting of ketone resins, epoxy resins, polyesters and polyurethanes, the weight ratio of the thermosetting resins/ABS resin being 90:10–10:90.

7. An undercoat paint comprising the coating solution according to claim 1 and styrene monomer, the weight ratio of styrene monomer/ABS resin being 90:10–10:90.

8. The coating solution according to claim 1, wherein the butanol diluent is provided by a lacquer thinner consisting of, by weight, 10% n-butyl alcohol, 60% xylene, 10% n-butyl acetate and 15% mixed amyl acetates.

References Cited

UNITED STATES PATENTS 3,338,862   8/1967   Baker _____ 260—33.6

OTHER REFERENCES

Mark et al.: "Encyclopedia of Polymer Science and Technology," vol. 1, (Wiley) (New York), pp. 440–441 (1964).

MORRIS LIEBMAN, Primary Examiner

H. H. FLETCHER, Assistant Examiner

U.S. Cl. X.R.

260—33.4, 33.6, 33.8, 80.7, 881, 893